Patented Oct. 25, 1932

1,885,066

UNITED STATES PATENT OFFICE

HENRY W. H. WARREN, OF COVENTRY, AND CHARLES G. GARTON AND ALBERT E. SMITH, OF RUGBY, ENGLAND, ASSIGNORS TO GENERAL ELECTRIC COMPANY, A CORPORATION OF NEW YORK

METHOD OF MOLDING

No Drawing. Application filed January 9, 1930, Serial No. 419,735, and in Great Britain February 11, 1929.

This invention relates to the manufacture of moulded articles and more particularly to articles which have thin walls such as cylinders, cones, discs or sheets. It is common practice to make such articles of paper or textile fabric stiffened by being impregnated or coated with a varnish or synthetic resin which is set or cured by being treated in a heated mould.

The object of this invention is to provide an improved material for the manufacture of articles of the above type and to that end it consists in using a dry fibrous mass, the pores or interstices in which, are filled with a bonding material such as a synthetic resin, the mass being then subjected to heat and pressure in a mould to shape it and cure the resin.

In carrying this invention into effect according to one modification, we may use as the basic material an intermediate product in the manufacture of pressboard namely, the felted fibrous mass which is fed to the final presses or calenders. This mass is a thick wet agglomeration of fibrous pulp and the water in it may be first replaced by alcohol or methylated spirit as for example by soaking it, or pieces cut therefrom, in the spirit for, say, at least an hour. Upon removal from the spirit the mass aforesaid is immediately immersed in a bonding material such as a synthetic resin, of the phenol-formaldehyde, urea-formaldehyde or glycerine phthalic anhydride type. The sheeted mass, or the cut pieces, may be allowed to soak in the synthetic resin in the form of a varnish for example, for a period of, say, at least an hour or for such a period as will be found to be beneficial by those skilled in the art to which the invention pertains. After removal from the varnish the impregnated sheets or pieces are usually allowed to dry before the molding operation is carried out.

There is thus obtained a spongy or porous mass, the interstices being filled with a bonding material and when the mass is pressed in a heated mould, consolidation throughout the mass is effected, yielding a rigid product which is particularly suitable for making these thin walled articles.

What we claim as new and desire to secure by Letters Patent of the United States is:

The method of making a molded thin walled article which consists in using as basic material wet felted fibrous pulp, replacing the water in said pulp by alcohol, replacing the alcohol by a synthetic resin which is convertible to the cured state by heat and pressure, and molding the impregnated mass under heat and pressure.

In witness whereof, we have hereunto set our hands this 17th day of December, 1929.

HENRY W. H. WARREN.
CHARLES G. GARTON.
ALBERT E. SMITH.